US012767001B2

(12) United States Patent
Li et al.

(10) Patent No.: US 12,767,001 B2
(45) Date of Patent: Oct. 20, 2026

(54) BATTERY POWER LIMIT PROTECTION METHOD AND SYSTEM, AND STORAGE MEDIUM

(71) Applicant: Sunwoda Mobility Energy Technology Co., Ltd., Shenzhen (CN)

(72) Inventors: Jianjie Li, Shenzhen (CN); Tao Wu, Shenzhen (CN)

(73) Assignee: SUNWODA MOBILITY ENERGY TECHNOLOGY CO., LTD., Shenzhen (CN)

( * ) Notice: Subject to any disclaimer, the term of this patent is extended or adjusted under 35 U.S.C. 154(b) by 17 days.

(21) Appl. No.: 18/871,306

(22) PCT Filed: Aug. 17, 2023

(86) PCT No.: PCT/CN2023/113557
§ 371 (c)(1),
(2) Date: Dec. 3, 2024

(87) PCT Pub. No.: WO2024/041445
PCT Pub. Date: Feb. 29, 2024

(65) Prior Publication Data

US 2026/0077678 A1 Mar. 19, 2026

(30) Foreign Application Priority Data

Aug. 26, 2022 (CN) ......................... 202211030869.1

(51) Int. Cl.
*B60L 58/14* (2019.01)
*B60L 58/13* (2019.01)
*B60L 58/15* (2019.01)

(52) U.S. Cl.
CPC ............... *B60L 58/14* (2019.02); *B60L 58/13* (2019.02); *B60L 58/15* (2019.02); *B60L 2240/545* (2013.01); *B60L 2240/547* (2013.01)

(58) Field of Classification Search
CPC .......... B60L 58/14; B60L 58/13; B60L 58/15; B60L 2240/545; B60L 2240/547
See application file for complete search history.

(56) References Cited

U.S. PATENT DOCUMENTS 9,132,745 B1 * 9/2015 Lee ......................... B60L 50/66
9,372,238 B2 * 6/2016 Kim .................. G01R 31/3835
(Continued)

FOREIGN PATENT DOCUMENTS

CN 102044717 A 5/2011
CN 106314170 A 1/2017
(Continued)

OTHER PUBLICATIONS

International Searching Authority. International Search Report and Written Opinion for PCT Application No. PCT/CN2023/113557 and English translation, mailed Nov. 20, 2023, pp. 1-14.
(Continued)

*Primary Examiner* — Redhwan K Mawari
(74) *Attorney, Agent, or Firm* — Vivacqua Crane, PLLC

(57) ABSTRACT

A method and system for protecting a battery power limit, and a storage medium are disclosed. The method for protecting a battery power limit is applied to a vehicle with a battery management system. The method includes: acquiring temperature data, a state of charge, and a cell voltage extreme value of a battery, periodically; calculating a current maximum available power according to the temperature data and the state of charge; determining a power limit coefficient according to the cell voltage extreme value, and a voltage limited power interval corresponding to the temperature data; and obtaining an actual available power that the battery management system allows the vehicle to use according to the maximum available power and the power limit coeffi-
(Continued)

cient. According to the method, different temperature ranges can be adapted according to logic.

6 Claims, 5 Drawing Sheets

(56) References Cited

U.S. PATENT DOCUMENTS

| | | | | |
|---|---|---|---|---|
| 11,476,677 | B2 * | 10/2022 | Liu | H01M 10/0525 |
| 12,289,006 | B2 * | 4/2025 | Kwon | H01M 10/441 |
| 2006/0284614 | A1 * | 12/2006 | Kim | H02J 7/61 324/149 |
| 2013/0099752 | A1 * | 4/2013 | Jeon | H01M 10/425 320/132 |
| 2015/0006933 | A1 | 1/2015 | Park et al. | |
| 2016/0009182 | A1 * | 1/2016 | Nakanishi | B60L 53/11 701/22 |
| 2017/0001534 | A1 | 1/2017 | Cho et al. | |
| 2018/0111496 | A1 * | 4/2018 | Cholewa | B60L 58/13 |
| 2019/0181659 | A1 * | 6/2019 | Kim | H01M 10/425 |
| 2021/0231739 | A1 | 7/2021 | Hong et al. | |
| 2022/0283236 | A1 * | 9/2022 | Tang | G01R 31/3647 |

FOREIGN PATENT DOCUMENTS

| | | | | |
|---|---|---|---|---|
| CN | 107102271 A | | 8/2017 | |
| CN | 108839586 A | | 11/2018 | |
| CN | 110224461 A | * | 9/2019 | B60L 58/14 |
| CN | 110816287 A | * | 2/2020 | B60L 15/20 |
| CN | 108072844 B | * | 4/2020 | G01R 31/3648 |
| CN | 112677769 A | | 4/2021 | |
| CN | 115425704 A | | 12/2022 | |
| KR | 20210040704 A | | 4/2021 | |
| WO | 2018214266 A1 | | 11/2018 | |

OTHER PUBLICATIONS

Bai, Guojun., et al. "Development of Core Control Strategy for Power Battery Management System," China Academic Journal Electronic Publishing House, Article 1674-1986, 2019, pp. 1-6.

European Patent Office. Extended European Search Report for EP Application No. 23856535.2.0, mailed Sep. 3, 2025, pp. 1-18.

The State Intellectual Property Office of People's Republic of China. Decision of Rejection for CN Application No. 202211030869.1 and English translation, mailed Jan. 8, 2026, pp. 1-19.

The State Intellectual Property Office of People's Republic of China. First Office Action and Search Report for CN Application No. 202211030869.1 and English translation, mailed Jun. 3, 2025, pp. 1-22.

The State Intellectual Property Office of People's Republic of China. Second Office Action for CN Application No. 202211030869.1 and English translation, mailed Aug. 29, 2025, pp. 1-18.

* cited by examiner

BATTERY POWER LIMIT PROTECTION METHOD AND SYSTEM, AND STORAGE MEDIUM

CROSS-REFERENCE TO RELATED APPLICATIONS

This application is a national stage filing under 35 U.S.C. § 371 of international application number PCT/CN2023/113557, filed Aug. 17, 2023, which claims priority to Chinese patent application No. 202211030869.1 filed Aug. 26, 2022. The contents of these applications are incorporated herein by reference in their entirety.

TECHNICAL FIELD

The present disclosure relates to the technical field of power battery management, and in particular, to a method and system for protecting a battery power limit, and a storage medium.

BACKGROUND

Currently, the battery power limit protection in the battery management system is based on the voltage-segmented power limit method, which divides the battery voltage range into different voltage intervals, and assigns different power limit coefficients for different voltage intervals. The closer to the voltage alarm region, the larger the power limit coefficient, thus achieving the effect of segmented power limit. However, this voltage-segmented power limit method has high requirements on selection of points for the voltage intervals and the respective power limit coefficients within the voltage intervals. Since there is only one fixed voltage limit coefficient in a certain voltage interval, it is easy for situations to arise where the power cannot be limited in a certain voltage interval, and is overly limited in the next voltage interval. Therefore, this method has a low power limit accuracy and provides poor protection for the battery.

SUMMARY

The present disclosure aims to solve at least one of the technical problems existing in the related art. To this end, the present disclosure provides a method and system for protecting a battery power limit, and a storage medium that can automatically adapt to voltage limited power intervals at different temperatures, and obtain the power limit coefficient in real time according to the cell voltage extreme value and the voltage limited power interval, improving the accuracy of controlling the actual available power and enhancing the protection of the battery.

In a first aspect, an embodiment of the present disclosure provides a method for protecting a battery power limit, applied to a vehicle, the vehicle being provided with a battery management system, where the method includes:

- acquiring temperature data, a state of charge, and a cell voltage extreme value of a battery, periodically;
- calculating a current maximum available power according to the temperature data and the state of charge, where the maximum available power includes a maximum discharging power and a maximum charging power;
- determining a power limit coefficient according to the cell voltage extreme value, and a voltage limited power interval corresponding to the temperature data; and
- obtaining an actual available power that the battery management system allows the vehicle to use according to the maximum available power and the power limit coefficient.

According to one or more technical solutions provided in an embodiment of the present disclosure, there are at least the following beneficial effects. By acquiring temperature data, a state of charge, and a cell voltage extreme value of a battery, periodically; calculating current maximum available power according to the temperature data and the state of charge; determining a power limit coefficient according to the cell voltage extreme value, and a voltage limited power interval corresponding to the temperature data; and obtaining an actual available power that the battery management system allows the vehicle to use according to the maximum available power and the power limit coefficient, the method of the present disclosure can automatically adapt to voltage limited power intervals at different temperatures, calculate and obtain the power limit coefficient in real time according to the cell voltage extreme value and the voltage limited power interval, which improves the accuracy of controlling the actual available power and controls the battery usage voltage within a safe range, thereby improving protection for the battery, and slowing down the aging of the battery.

According to some embodiments of the present disclosure, a calculation formula for obtaining an actual available power that the battery management system allows the vehicle to use according to the maximum available power and the power limit coefficient is as follows:

$$P = Power_{Max} \times Limit_{Rate},$$

where P denotes the actual available power, $Power_{Max}$ denotes the maximum available power, and $Limit_{Rate}$ denotes the power limit coefficient.

According to some embodiments of the present disclosure, the battery power limit includes a discharging power limit and a charging power limit, in the discharging power limit, the power limit coefficient is a first power limit coefficient, the cell voltage extreme value is a minimum cell voltage, the voltage limited power interval includes a discharging power limit starting voltage, a discharging power limit cut-off voltage and a discharging power limit recovery voltage; and the determining a power limit coefficient according to the cell voltage extreme value, and a voltage limited power interval corresponding to the temperature data includes:

- determining the first power limit coefficient by comparing the minimum cell voltage with the discharging power limit starting voltage, the discharging power limit cut-off voltage and the discharging power limit recovery voltage, respectively.

According to some embodiments of the present disclosure, the determining the first power limit coefficient by comparing the minimum cell voltage with the discharging power limit starting voltage, the discharging power limit cut-off voltage and the discharging power limit recovery voltage respectively includes:

- acquiring an initial discharging power limit coefficient;
- in response to the minimum cell voltage being not less than the discharging power limit starting voltage, determining the first power limit coefficient to be the initial discharging power limit coefficient;

in response to the minimum cell voltage being not greater than the discharging power limit cut-off voltage, determining the first power limit coefficient to be zero;

in response to the minimum cell voltage being between the discharging power limit starting voltage and the discharging power limit cut-off voltage, calculating and obtaining the first power limit coefficient according to a first voltage power limit coefficient formula; and in response to the minimum cell voltage being greater than the discharging power limit recovery voltage, determining the first power limit coefficient to be the initial discharging power limit coefficient.

According to some embodiments of the present disclosure, the first voltage power limit coefficient formula is as follows:

$$Limit_{Rate1} = \frac{Vltg_{Min} - V_2}{V_1 - V_2} \times Limit_{Rate3},$$

where $Limit_{Rate1}$ denotes the first power limit coefficient, $Vltg_{Min}$ denotes the minimum cell voltage, $V_1$ denotes the discharging power limit starting voltage, $V_2$ denotes the discharging power limit cut-off voltage, and $Limit_{Rate3}$ denotes the initial discharging power limit coefficient.

According to some embodiments of the present disclosure, the battery power limit includes a discharging power limit and a charging power limit, in the charging power limit, the power limit coefficient is a second power limit coefficient, the cell voltage extreme value is a maximum cell voltage, the voltage limited power interval includes a charging power limit starting voltage, a charging power limit cut-off voltage and a charging power limit recovery voltage; and the determining a power limit coefficient according to the cell voltage extreme value, and a voltage limited power interval corresponding to the temperature data includes:

determining the second power limit coefficient by comparing the maximum cell voltage with the charging power limit starting voltage, the charging power limit cut-off voltage and the charging power limit recovery voltage respectively.

According to some embodiments of the present disclosure, the determining the second power limit coefficient by comparing the maximum cell voltage with the charging power limit starting voltage, the charging power limit cut-off voltage and the charging power limit recovery voltage respectively includes:

acquiring an initial charging power limit coefficient;

in response to the maximum cell voltage being not greater than the charging power limit starting voltage, determining the second power limit coefficient to be the initial charging power limit coefficient;

in response to the maximum cell voltage being not less than the charging power limit cut-off voltage, determining the second power limit coefficient to be zero;

in response to the maximum cell voltage being between the charging power limit starting voltage and the charging power limit cut-off voltage, calculating and obtaining the second power limit coefficient according to a second voltage power limit coefficient formula; and in response to the maximum cell voltage being less than the charging power limit recovery voltage, determining the second power limit coefficient to be the initial charging power limit coefficient.

According to some embodiments of the present disclosure, the second voltage power limit coefficient formula is as follows:

$$Limit_{Rate2} = Limit_{Rate4} - \frac{V_5 - Vltg_{Max}}{V_5 - V_4} \times Limit_{Rate4},$$

where $Limit_{Rate2}$ denotes the second power limit coefficient, $Vltg_{Max}$ denotes the maximum cell voltage, $V_4$ denotes the charging power limit starting voltage, $V_5$ denotes the charging power limit cut-off voltage, and $Limit_{Rate4}$ denotes the initial charging power limit coefficient.

In a second aspect, a system for protecting a battery power limit according to an embodiment of the present disclosure includes a memory, a processor and a computer program stored on the memory and executed on the processor, where the computer program, when executed by the processor, causes the processor to implement the method for protecting a battery power limit in the first aspect.

In a third aspect, a computer-readable storage medium according to an embodiment of the present disclosure stores computer executable instructions for causing the computer to implement the method for protecting a battery power limit in the first aspect.

Additional aspects and advantages of the present disclosure will be set forth in part in the description hereinafter, and in part will be apparent from the description, or may be learned by a practice of the present disclosure.

BRIEF DESCRIPTION OF DRAWINGS

The drawings are provided for further understanding of the technical solutions of the present disclosure, and constitute a part of the description. The drawings and the embodiments of the present disclosure are used to explain the technical solutions of the present disclosure, and do not constitute a limitation to the technical solutions of the present disclosure.

DETAILED DESCRIPTION

In order to make the objectives, technical solutions, and advantages of the present disclosure clearer and more understandable, the present disclosure will be further described in detail below in conjunction with the accompanying drawings and embodiments. It is to be understood that the specific embodiments described here are merely used to explain the present disclosure and are not intended to limit the present disclosure.

It needs to be noted that although the functional modules are divided in the apparatus schematic diagrams and the logical sequence is shown in the flowcharts, in some cases, the apparatus may have different module divisions, or the steps shown or described in the flowcharts may be performed in an different order. The terms such as "first", "second" in the description, claims, and above-mentioned drawings are used to distinguish similar objects and are not necessarily used to describe a specific order or sequence.

Currently, the battery power limit protection in the battery management system is based on the voltage-segmented power limit method, which divides the battery voltage range into different voltage intervals, and assigns different power limit coefficients for different voltage intervals. The closer to the voltage alarm region, the larger the power limit coefficient, thus achieving the effect of segmented power limit. However, this voltage-segmented power limit method has high requirements on selection of points for the voltage intervals and the respective power limit coefficients within the voltage intervals. Since there is only one fixed voltage limit coefficient in a certain voltage interval, it is easy for situations to arise where the power cannot be limited in a certain voltage interval, and is overly limited in the next voltage interval. Therefore, this method has a low power limit accuracy and provides poor protection for the battery.

Based on this, embodiments of the present disclosure provide a method and system for protecting a battery power limit, and a storage medium that can automatically adapt to voltage limited power intervals at different temperatures, and calculate and obtain the power limit coefficient in real time according to the cell voltage extreme value and the voltage limited power interval, improving the accuracy of controlling the actual available power and enhancing the protection of the battery.

Embodiments of the present disclosure will be further described hereinafter with reference to the accompanying drawings.

Figure 1:
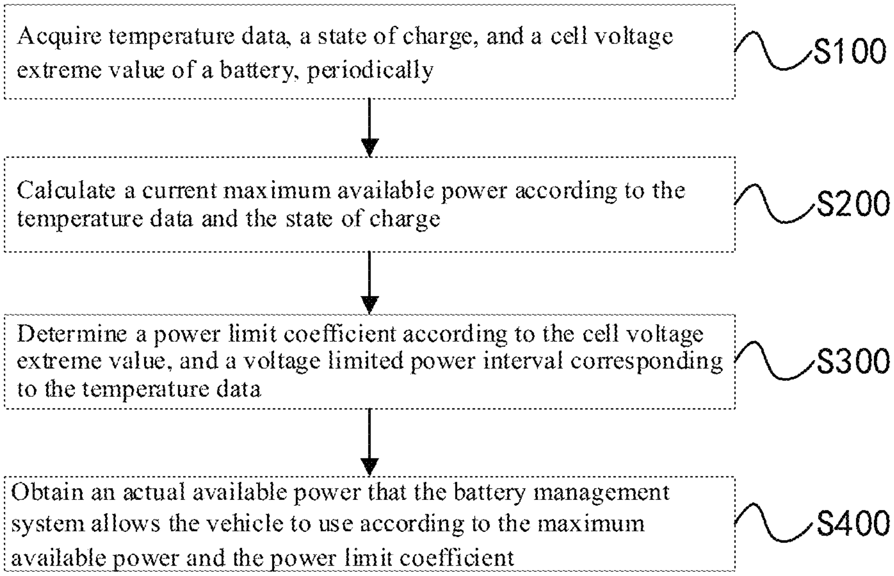
FIG. 1 is a schematic flowchart of a method for protecting a battery power limit provided by an embodiment of the present disclosure.

In a first aspect, an embodiment of the present disclosure specifically provides a method for protecting a battery power limit, as shown in FIG. 1. The method for protecting a battery power limit is applied to a vehicle, the vehicle is provided with a battery management system, the method includes but is not limited to the following steps:

S100: periodically acquiring temperature data, a state of charge, and a cell voltage extreme value of a battery;

S200: calculating a current maximum available power according to the temperature data and the state of charge; where the maximum available power includes a maximum discharging power and a maximum charging power.

S300: determining a power limit coefficient according to the cell voltage extreme value, and a voltage limited power interval corresponding to the temperature data; and

S400: obtaining an actual available power that the battery management system allows the vehicle to use according to the maximum available power and the power limit coefficient.

It should be noted that the method for protecting a battery power limit provided by this embodiment is applied to the battery management system of new energy vehicles such as pure electric vehicles or hybrid electric vehicles. The battery management system controls the maximum discharging power and the maximum regenerative power of the vehicle according to the actual available power, in order to avoid a battery failure such as over-discharge and over-charge. According to this method for protecting a battery power limit, it can automatically adapt to voltage limited power intervals at different temperatures; calculate and obtain the power limit coefficient in real time according to the cell voltage extreme value and the voltage limited power interval; and improve the accuracy of controlling the actual available power and control the battery usage voltage within a safe range, thereby improving protection for the battery, and slowing down the aging of the battery.

It should be noted that the extreme value of the cell voltage is the voltage value closest to the protection critical voltage among a plurality of cell voltages. For example, the cell voltage extreme value in the process of limiting the discharging power is a minimum cell voltage among all battery cells of a plurality of battery modules in the current battery; and the cell voltage extreme value in the process of limiting the charging power is a maximum cell voltage among all battery cells of a plurality of battery modules in the current battery. The battery includes at least one battery module, which includes at least one cell, and the charging power limit is a regenerative power limit.

Figure 2:
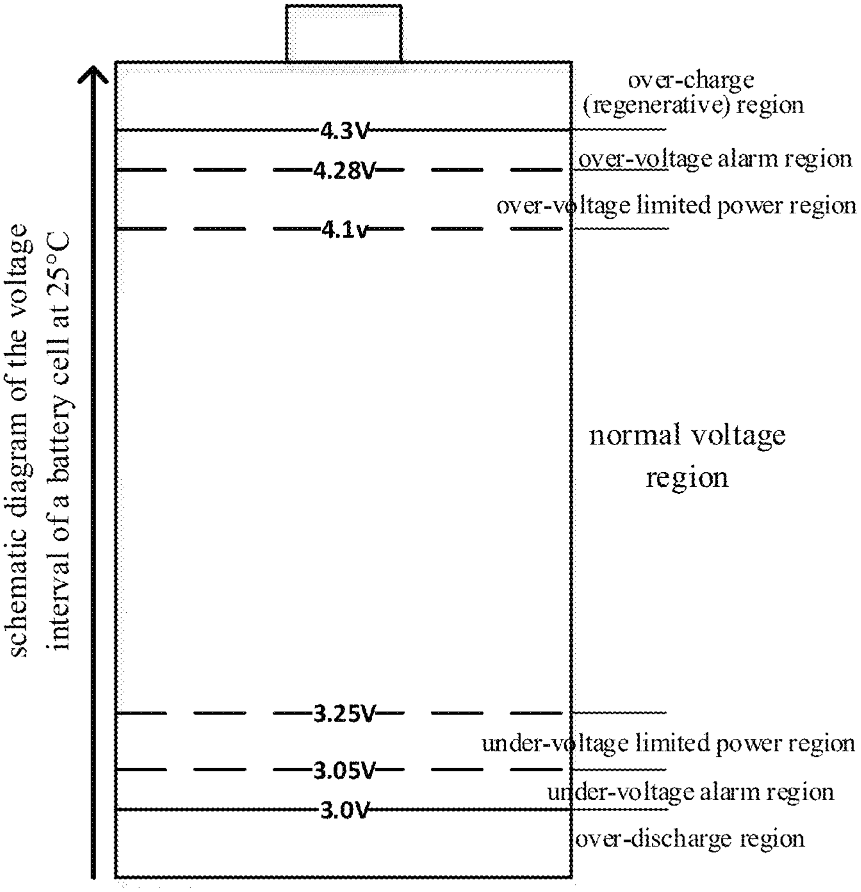
FIG. 2 is a schematic diagram showing voltage segmentation of the battery cell at 25° C. provided by an embodiment of the present disclosure.

It should be noted that, at different temperatures, the battery voltage range may be divided into seven different voltage intervals. For example, with reference to FIG. 2, at a temperature of 25° C. the battery voltage range is divided into a normal voltage region, a voltage limited power region, a voltage alarm region, an over-charge region, and an over-discharge region respectively: where the voltage limited power region includes an over-voltage limited power region and an under-voltage limited power region, the voltage alarm region includes an over-voltage alarm region and an under-voltage alarm region.

Specifically, when the battery is in the normal voltage region, the battery can be used normally, and the power output by the battery management system, that is, the battery output power, is not limited. When the battery is in the voltage limited power region, the voltage is abnormal, and the power output by the battery management system, that is, the battery output power, is limited. When the battery is in the voltage alarm region, the battery management system will send out a fault alarm signal, and limit the power output. When the battery is in the over-charge region, the voltage has already been in an over-charge state, and when the battery is used in this over-charge region, the aging of the battery will be accelerated. When the battery is in the over-discharge region, the voltage has already been in an over-discharge state, when the battery is used in over-discharge region, the aging of the battery will also be accelerated. Therefore, the battery management system must limit the battery output power in the voltage limited power region, to prevent the voltage trend from deteriorating.

In related technologies, the battery power limit protection in the battery management system uses the voltage-segmented power limit method to re-segment the voltage range in different temperature ranges, and to redistribute the limiting proportional coefficient, making the application of this method more complex. The method for protecting a battery power limit provided by the embodiment of the present disclosure can be adapted to different temperature ranges according to logic. The corresponding power limit coefficient can be automatically obtained according to the currently collected cell voltage extreme value, and the voltage interval at the current temperature, making the use of this battery power limitation protection method more convenient and simple.

It should be noted that the method for protecting a battery power limit includes a discharging power limit protection and a charging power limit protection, wherein the charging power limit protection is a regenerative power limit protection.

For example, during a process of discharging power limit protection, upon acquiring a maximum discharging power of the battery according to the temperature data and the state of charge, the following table could be referred to:

| battery maximum discharging power/kw | | | | | | | | | | | |
|---|---|---|---|---|---|---|---|---|---|---|---|
| | SOC | | | | | | | | | | |
| Temp | 0% | 10% | 20% | 30% | 40% | 50% | 60% | 70% | 80% | 90% | 100% |
| −30° C. | 0.0 | 1.2 | 2.3 | 3.5 | 7.3 | 11.1 | 12.8 | 15.6 | 15.6 | 15.6 | 15.6 |
| −20° C. | 0.0 | 2.3 | 4.6 | 6.9 | 13.4 | 20.0 | 21.4 | 24.5 | 24.5 | 24.5 | 24.5 |
| −10° C. | 0.0 | 4.0 | 7.9 | 11.9 | 18.9 | 25.9 | 27.8 | 31.0 | 31.0 | 31.0 | 31.0 |
| 0° C. | 0.0 | 6.9 | 13.8 | 20.7 | 27.2 | 32.4 | 36.3 | 39.1 | 39.1 | 39.1 | 39.1 |
| 10° C. | 0.0 | 9.6 | 19.3 | 28.9 | 36.8 | 42.4 | 46.3 | 49.2 | 49.2 | 49.2 | 49.2 |
| 20° C. | 0.0 | 12.5 | 25.0 | 37.5 | 46.3 | 51.8 | 55.5 | 58.5 | 58.5 | 58.5 | 58.5 |
| 30° C. | 0.0 | 13.9 | 27.8 | 41.7 | 50.7 | 56.0 | 59.5 | 62.6 | 62.6 | 62.6 | 62.6 |
| 40° C. | 0.0 | 13.9 | 27.8 | 41.7 | 50.7 | 56.0 | 59.5 | 62.6 | 62.6 | 62.6 | 62.6 |
| 50° C. | 0.0 | 13.9 | 27.8 | 41.7 | 50.7 | 56.0 | 59.5 | 62.6 | 62.6 | 62.6 | 62.6 |
| 60° C. | 0.0 | 13.9 | 27.8 | 41.7 | 50.7 | 56.0 | 59.5 | 62.6 | 62.6 | 62.6 | 62.6 |

During a process of charging power limit protection, upon acquiring a maximum charging power of the battery according to the temperature data and the state of charge, the following table could be referred to:

| battery maximum charging power/kw | | | | | | | | | | | |
|---|---|---|---|---|---|---|---|---|---|---|---|
| | SOC | | | | | | | | | | |
| Temp | 0% | 10% | 20% | 30% | 40% | 50% | 60% | 70% | 80% | 90% | 100% |
| −30° C. | 1.9 | 1.9 | 1.9 | 1.9 | 1.8 | 1.6 | 1.3 | 0.9 | 0.6 | 0.3 | 0.0 |
| −20° C. | 5.3 | 5.3 | 5.3 | 5.3 | 5.1 | 4.4 | 3.5 | 2.6 | 1.7 | 0.9 | 0.0 |
| −10° C. | 11.1 | 11.1 | 11.1 | 11.1 | 10.6 | 9.2 | 7.3 | 5.3 | 3.6 | 1.8 | 0.0 |
| 0° C. | 21.1 | 21.1 | 21.1 | 21.1 | 19.7 | 17.4 | 14.0 | 10.5 | 7.0 | 3.5 | 0.0 |
| 10° C. | 32.9 | 32.9 | 32.9 | 32.9 | 30.4 | 27.1 | 22.1 | 17.1 | 11.4 | 5.7 | 0.0 |
| 20° C. | 45.5 | 45.5 | 45.5 | 45.5 | 41.5 | 37.4 | 31.1 | 24.8 | 16.5 | 8.3 | 0.0 |
| 30° C. | 51.4 | 51.4 | 51.4 | 51.4 | 46.6 | 42.3 | 35.5 | 28.6 | 19.1 | 9.5 | 0.0 |
| 40° C. | 51.4 | 51.4 | 51.4 | 51.4 | 46.6 | 42.3 | 35.5 | 28.6 | 19.1 | 9.5 | 0.0 |
| 50° C. | 51.4 | 51.4 | 51.4 | 51.4 | 46.6 | 42.3 | 35.5 | 28.6 | 19.1 | 9.5 | 0.0 |
| 60° C. | 51.4 | 51.4 | 51.4 | 51.4 | 46.6 | 42.3 | 35.5 | 28.6 | 19.1 | 9.5 | 0.0 |

where Temp is an abbreviation of Temperature, and denotes temperature data; SOC is an abbreviation of State of Charge, which is translated as state of charge.

It can be appreciated that, the calculation formula for obtaining an actual available power that the battery management system allows the vehicle to use according to the maximum available power and the power limit coefficient, is as follows:

$$P = Power_{Max} \times Limit_{Rate},$$

where P denotes the actual available power, $Power_{Max}$ denotes the maximum available power, and $Limit_{Rate}$ denotes the power limit coefficient.

It should be noted that the calculation formula of the actual available power can be actually applied to both the discharging power limit protection method and the charging power limit protection method.

Figure 3:
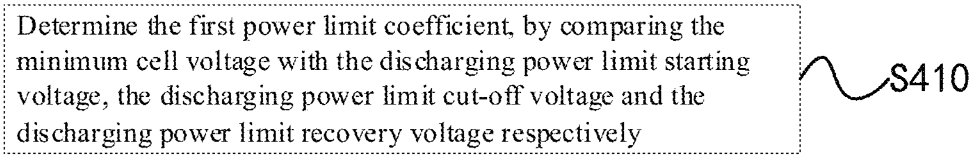
FIG. 3 is a schematic flowchart of acquiring a first power limit coefficient provided by an embodiment of the present disclosure.

With reference to FIG. 3, it can be appreciated that battery power limit includes a discharging power limit and a charging power limit, in the process of limiting the discharging power, the power limit coefficient is a first power limit coefficient, the cell voltage extreme value is a minimum cell voltage, the voltage limited power interval includes a discharging power limit starting voltage, a discharging power limit cut-off voltage and a discharging power limit recovery voltage. S400 includes but is not limited to the following step:

S410: determining the first power limit coefficient, by comparing the minimum cell voltage with the discharging power limit starting voltage, the discharging power limit cut-off voltage and the discharging power limit recovery voltage respectively.

It should be noted that, in the process of limiting the discharging power, the first power limit coefficient becomes smaller and smaller. When the minimum cell voltage gradually rises, the first power limit coefficient still maintains the calculated value at the previous moment. Only when the minimum cell voltage rises to the discharge power limit recovery voltage, the first power limit coefficient will increase and return to the default value.

Figure 4:
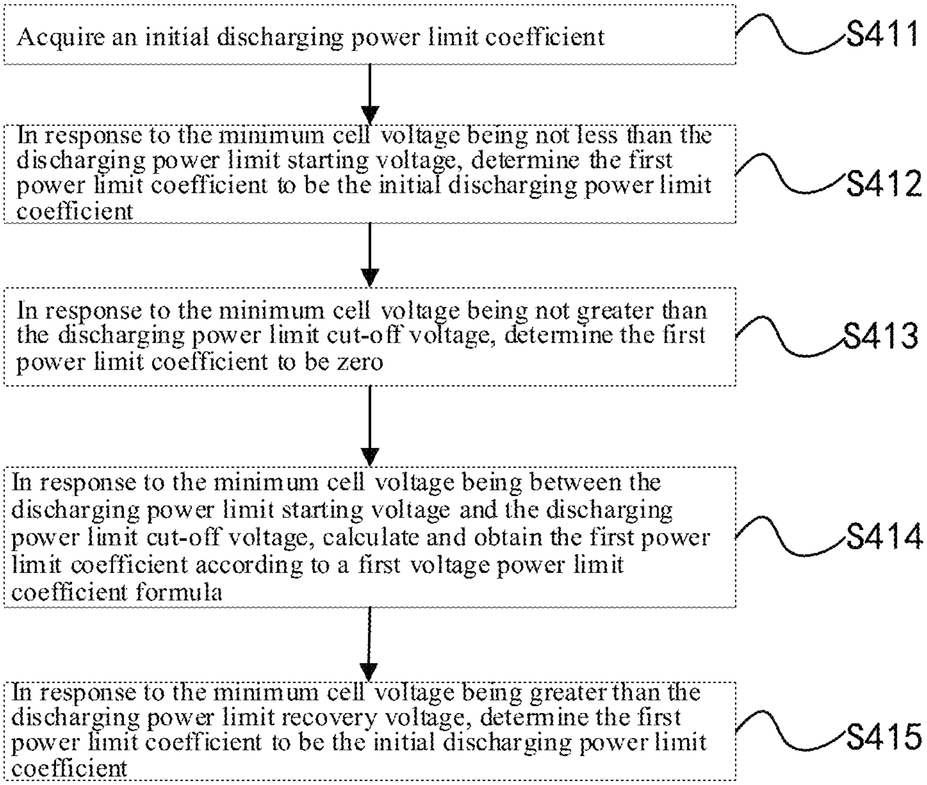
FIG. 4 is a schematic flowchart of a specific process for acquiring the first power limit coefficient provided by an embodiment of the present disclosure.
Figure 5:
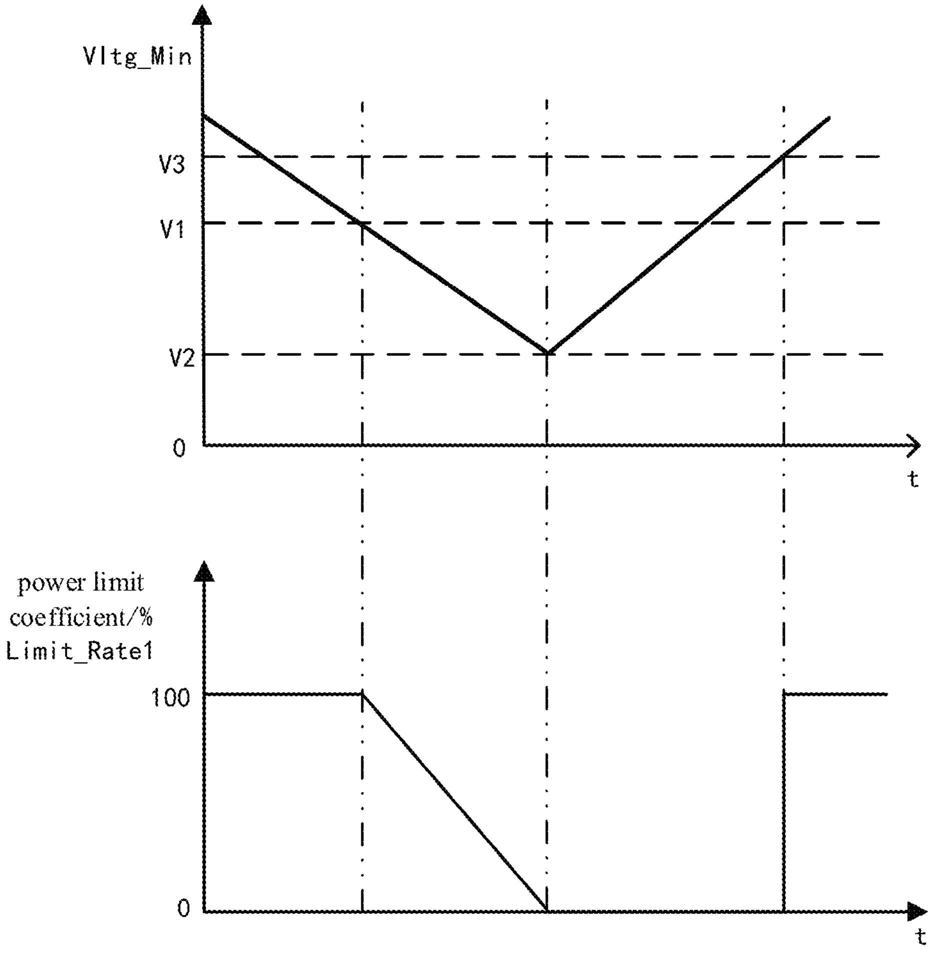
FIG. 5 is a schematic logical diagram of linear power reduction provided by an embodiment of the present disclosure.

With reference to FIG. 4 to FIG. 5, it can be appreciated that step S410, includes but is not limited to the following steps:

S411: acquiring an initial discharging power limit coefficient;

S412: in response to the minimum cell voltage being not less than the discharging power limit starting voltage, determining the first power limit coefficient to be the initial discharging power limit coefficient;

S413: in response to the minimum cell voltage being not greater than the discharging power limit cut-off voltage, determining the first power limit coefficient to be zero;

S414: in response to the minimum cell voltage being between the discharging power limit starting voltage and the discharging power limit cut-off voltage, calculating and obtaining the first power limit coefficient according to a first voltage power limit coefficient formula; and

S415: in response to the minimum cell voltage being greater than the discharging power limit recovery voltage, determining the first power limit coefficient to be the initial discharging power limit coefficient.

In this embodiment, the initial discharging power limit coefficient is a default value 100%, that is, when the minimum cell voltage is not less than the discharging power limit starting voltage, the first power limit coefficient is 100%: when the minimum cell voltage is greater than the discharging power limit recovery voltage, the first power limit coefficient is also 100%.

It should be noted that, with reference to FIG. 5, $V_1$ denotes the discharging power limit starting voltage, $V_2$ denotes the discharging power limit cut-off voltage, $V_3$ denotes the discharging power limit recovery voltage, $Vltg_{Min}$ denotes the minimum cell voltage, and $Limit_{Rate1}$ denotes the first power limit coefficient.

It should be noted that, with reference to FIG. 5, during the discharging power limit process, the method for protecting a battery power limit provided by this embodiment changes linearly with the minimum cell voltage collected in real time. This method is simple to operate, and also improves the accuracy of the actual available power obtained according to the first power limit coefficient, and may be used in the entire temperature range, and can be adapted to a variety of different projects.

It should be noted that values of the discharging power limit starting voltage, the discharging power limit cut-off voltage and the discharging power limit recovery voltage are provided by the battery manufacturer or determined according to a fault alarm voltage point. Illustrated as an example, reference may be made to the following table:

| | Temp | | | | | | | | | |
|---|---|---|---|---|---|---|---|---|---|---|
| Vltg | −40° C. | −30° C. | −20° C. | −10° C. | 0° C. | 10° C. | 25° C. | 45° C. | 50° C. | 60° C. |
| $V_1$ | 2.7 | 2.7 | 2.7 | 3 | 3 | 3.25 | 3.25 | 3.25 | 3.25 | 3.25 |
| $V_2$ | 2.4 | 2.4 | 2.4 | 2.6 | 2.6 | 2.8 | 2.8 | 2.8 | 2.8 | 2.8 |
| $V_3$ | 2.9 | 2.9 | 2.9 | 3.2 | 3.2 | 3.45 | 3.45 | 3.45 | 3.45 | 3.45 |

It can be appreciated that the first voltage power limit coefficient formula in step S414 is as follows:

$$Limit_{Rate1} = \frac{Vltg_{Min} - V_2}{V_1 - V_2} \times Limit_{Rate3},$$

where $Limit_{Rate1}$ denotes the first power limit coefficient, $Vltg_{Min}$ denotes the minimum cell voltage, $V_1$ denotes the discharging power limit starting voltage, $V_2$ denotes the discharging power limit cut-off voltage, $Limit_{Rate3}$ denotes the initial discharging power limit coefficient, and the units of $V_1$, $V_2$ and $V_3$ are all volts.

In this embodiment, the initial discharging power limit coefficient is a default value 100%, therefore, the first voltage power limit coefficient formula may be further denoted as follows:

$$Limit_{Rate1} = \frac{Vltg_{Min} - V_2}{V_1 - V_2} \times 100\%.$$

Figure 6:
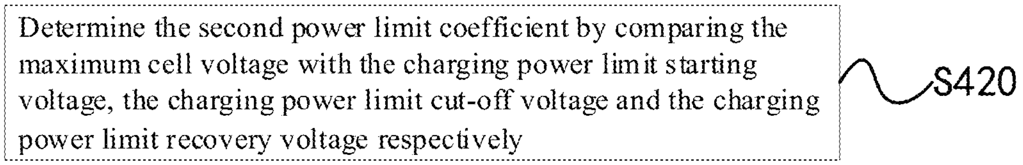
FIG. 6 is a schematic flowchart of acquiring a second power limit coefficient provided by another embodiment of the present disclosure.

With reference to FIG. 6, it can be appreciated that battery power limit includes a discharging power limit and a charging power limit, in the process of limiting the charging power, the power limit coefficient is a second power limit coefficient, the cell voltage extreme value is a maximum cell voltage, the voltage limited power interval includes a charging power limit starting voltage, a charging power limit cut-off voltage and a charging power limit recovery voltage. Step S400, includes but is not limited to the following step:

S420: determining the second power limit coefficient, by comparing the maximum cell voltage with the charging power limit starting voltage, the charging power limit cut-off voltage and the charging power limit recovery voltage, respectively.

It should be noted that during the charging power limit process, the second power limit coefficient becomes larger and larger. At this time, the maximum cell voltage gradually decreases, and the second power limit coefficient still maintains the calculated value at the previous moment. Only when the maximum cell voltage has been reduced to the charging power limit recovery voltage, the second power limit coefficient will be recovered to the default value.

Figure 7:
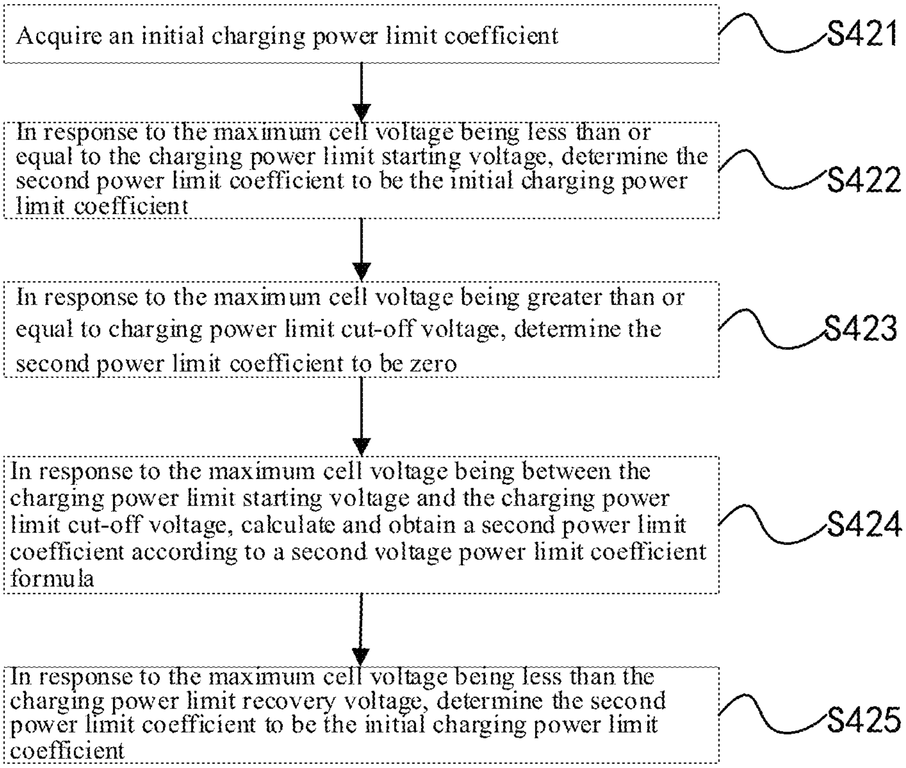
FIG. 7 is a schematic flowchart of a specific process for acquiring the second power limit coefficient provided by another embodiment of the present disclosure.
Figure 8:
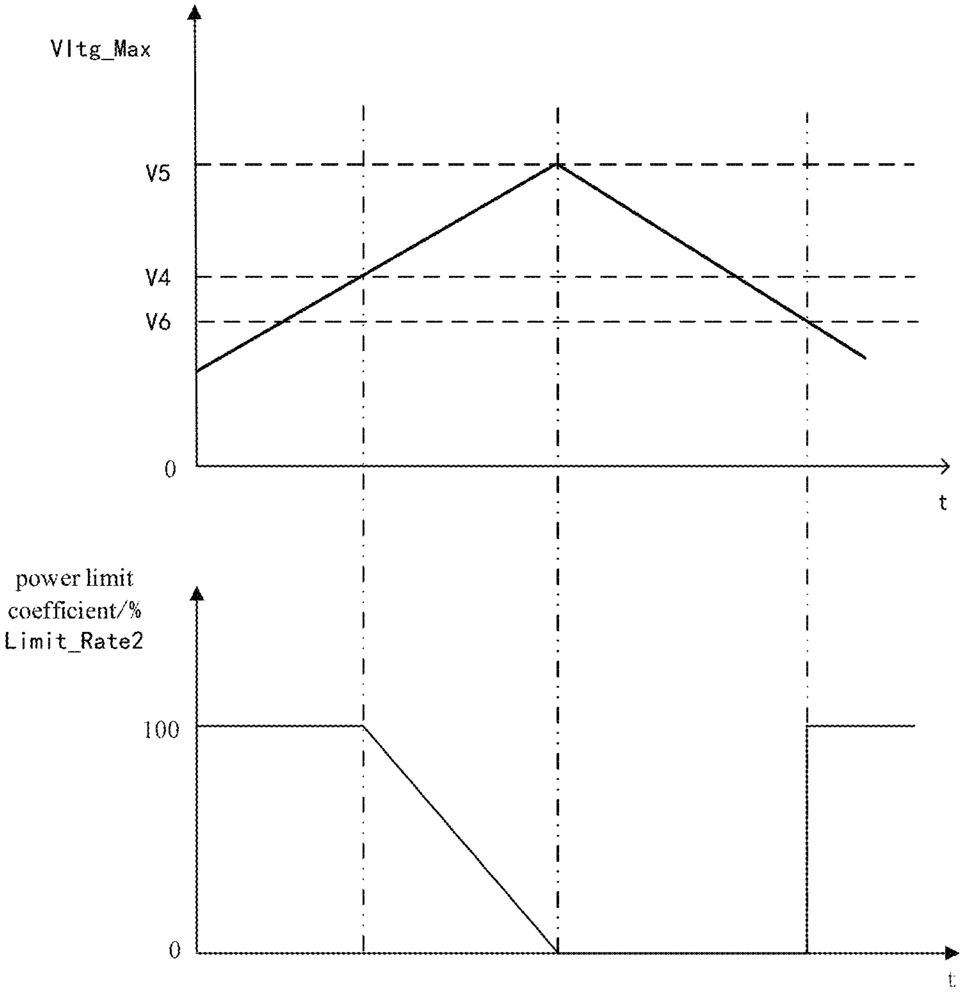
FIG. 8 is a schematic logical diagram of linear power reduction provided by another embodiment of the present disclosure.

With reference to FIG. 7 to FIG. 8, it can be appreciated that step S420, includes but is not limited to the following steps:

S421: acquiring an initial charging power limit coefficient;

S422: in response to the maximum cell voltage being not greater than the charging power limit starting voltage, determining the second power limit coefficient to be the initial charging power limit coefficient;

S423: in response to the maximum cell voltage being not less than charging power limit cut-off voltage, determining the second power limit coefficient to be zero;

S424: in response to the maximum cell voltage being between the charging power limit starting voltage and the charging power limit cut-off voltage, calculating and obtaining a second power limit coefficient according to a second voltage power limit coefficient formula;

S425: in response to the maximum cell voltage being less than the charging power limit recovery voltage, determining the second power limit coefficient to be the initial charging power limit coefficient.

In this embodiment, the initial charging power limit coefficient is a default value 100%, that is, when the maximum cell voltage is not greater than the charging power limit starting voltage, the second power limit coefficient is 100%; and when the maximum cell voltage is less than the charging power limit recovery voltage, the second power limit coefficient is also 100%.

It should be noted that, referring to FIG. 8, $V_4$ denotes the charging power limit starting voltage, $V_5$ denotes the charging power limit cut-off voltage, $V_6$ denotes the charging power limit recovery voltage, $Vltg_{Max}$ denotes the maximum cell voltage, and $Limit_{Rate2}$ denotes the second power limit coefficient.

It should be noted that, with reference to FIG. 8, during the charging power limit process, the method for protecting a battery power limit provided by this embodiment changes linearly with the maximum cell voltage collected in real time. This method is simple to operate, and also improves the accuracy of the actual available power obtained according to the second power limit coefficient, and can be used in the entire temperature range, and can be adapted to a variety of different projects.

It should be noted that values of the charging power limit starting voltage, the charging power limit cut-off voltage and the charging power limit recovery voltage are provided by the battery manufacturer or determined according to a fault alarm voltage point. Illustrated as an example, reference may be made to the following table:

| | Temp | | | | | | | | | |
|---|---|---|---|---|---|---|---|---|---|---|
| Vltg | −40° C. | −30° C. | −20° C. | −10° C. | 0° C. | 10° C. | 25° C. | 45° C. | 50° C. | 60° C. |
| $V_4$ | 4.15 | 4.15 | 4.15 | 4.15 | 4.15 | 4.15 | 4.15 | 4.15 | 4.15 | 4.15 |
| $V_5$ | 4.25 | 4.25 | 4.25 | 4.25 | 4.25 | 4.25 | 4.25 | 4.25 | 4.25 | 4.25 |
| $V_6$ | 4.1 | 4.1 | 4.1 | 4.1 | 4.1 | 4.1 | 4.1 | 4.1 | 4.1 | 4.1 |

It can be appreciated that the second voltage power limit coefficient formula in step S424 is as follows:

$$Limit_{Rate2} = Limit_{Rate4} - \frac{V_5 - Vltg_{Max}}{V_5 - V_4} \times Limit_{Rate4},$$

where $Limit_{Rate2}$ denotes the second power limit coefficient, $Vltg_{Max}$ denotes the maximum cell voltage, $V_4$ denotes the charging power limit starting voltage, $V_5$ denotes the charging power limit cut-off voltage, $Limit_{Rate4}$ denotes the initial charging power limit coefficient, and the units of $V_4$, $V_5$ are both volts.

In this embodiment, the initial charging power limit coefficient is a default value 100%, therefore, and the second voltage power limit coefficient formula may be further denoted as follows:

$$Limit_{Rate2} = 100\% - \frac{V_5 - Vltg_{Max}}{V_5 - V_4} \times 100\%.$$

Moreover, in a second aspect, an embodiment of the present disclosure further provides a system for protecting a battery power limit, which includes: a memory, a processor and a computer program stored on the memory and executable on the processor.

The processor and the memory may be connected via a bus or other means.

As a non-transitory computer-readable storage medium, memory can be configured to store non-transitory software programs and non-transitory computer executable programs. In addition, the memory may include high-speed random-access memory and may also include non-transitory memory, such as at least one magnetic disk storage device, flash memory device, or other non-transitory solid-state storage device. In some embodiments, the memory may optionally include memories located remotely from the processor, and these remote memories may be connected to the processor via a network. Embodiments of the above-mentioned network includes but is not limited to the Internet, intranets, local region networks, mobile communication networks and combinations thereof.

The non-transient software programs and instructions required to implement the method for protecting a battery power limit according to the embodiment in the first aspect, are stored in the memory, which, when executed by the processor, cause the processor to perform the method for protecting a battery power limit in the above embodiment, for example, perform the method steps S100 to S400 in FIG. 1, the method step S410 in FIG. 3, the method steps S411 to S415 in FIG. 4, the method step S420 in FIG. 6, and the method steps S421 to S425 in FIG. 7.

The device embodiments described above are only illustrative, where the units described as separate components may or may not be physically separated, that is, they may fall into one place, or they may be distributed to multiple network units. Some or all of the modules may be selected according to actual needs, to achieve the objective of the embodiments of the present disclosure.

Moreover, an embodiment of the present disclosure further provides a computer-readable storage medium storing computer executable instructions which, when executed by a processor or a controller, for example, executed by a processor in the above device embodiments, may cause the above processor to perform the method for protecting a battery power limit in the above embodiment, for example, to perform the above method steps S100 to S400 in FIG. 1, the method step S410 in FIG. 3, and the method steps S411 to S415 in FIG. 4, the method step S420 in FIG. 6, and the method steps S421 to S425 in FIG. 7.

Those of ordinary skill in the art can understand that all or some steps in the method, and the system disclosed above can be implemented as software, firmware, hardware, and appropriate combinations thereof. Some or all of the physical components may be implemented as a software executed by a processor, such as a central processing unit, a digital signal processor, or a microprocessor, or as a hardware, or as an integrated circuit, such as an application specific integrated circuit. Such a software may be distributed on a computer-readable medium, which may include a computer storage medium (or a non-transitory medium) and a communication medium (or a transitory medium). As is known to those of ordinary skill in the art, the term computer storage medium includes a volatile and nonvolatile, removable and non-removable medium, which is implemented in any method or technology for storing information such as computer-readable instructions, data structures, program modules or other data. The computer storage medium includes, but is not limited to, RAM, ROM, EEPROM, flash memory or other memory technology, CD-ROM, Digital Versatile Disk (DVD) or other optical disk storage, magnetic cassettes, tapes, disk storage or other magnetic storage devices, or any other medium which may be used to store the desired information and may be accessed by a computer. Additionally, it is known to those of ordinary skill in the art that the communication medium typically contains computer-readable instructions, data structures, program modules, or other data in a modulated data signal such as a carrier wave or other transmission mechanism, and may include any information delivery medium.

Preferred embodiments of the present disclosure have been described in detail, but the present disclosure is not limited to the above embodiments. Those of ordinary skill in the art can also make various equivalent modifications or substitutions without departing the gist of the present disclosure. These equivalent modifications or substitutions are included within the scope limited by the claims of the present disclosure.

What is claimed is:

1. A method for protecting a battery power limit, applied to a vehicle, the vehicle being provided with a battery management system, wherein the battery power limit comprises a discharging power limit and a charging power limit, and the battery is provided with voltage limited power intervals corresponding to the temperature conditions under different temperature conditions, the method is performed by the battery management system and comprises:

acquiring temperature data, a state of charge, and a cell voltage extreme value of a battery, periodically;

calculating a current maximum available power according to the temperature data and the state of charge, wherein the maximum available power comprises a maximum discharging power and a maximum charging power;

determining a power limit coefficient according to the cell voltage extreme value, and a voltage limited power interval corresponding to the temperature data; and obtaining an actual available power of the battery that the battery management system allows the vehicle to use according to the maximum available power and the power limit coefficient, wherein a calculation formula for obtaining the actual available power that the battery management system allows the vehicle to use according to the maximum available power and the power limit coefficient is as follows:

$$P = Power_{Max} \times Limit_{Rate},$$

wherein P denotes the actual available power, $Power_{Max}$ denotes the maximum available power, and $Limit_{Rate}$ denotes the power limit coefficient; and in the discharging power limit, the power limit coefficient is a first power limit coefficient, the cell voltage extreme value is a minimum cell voltage, the voltage limited power interval comprises a discharging power limit starting voltage, a discharging power limit cut-off voltage and a discharging power limit recovery voltage, the maximum available power is the maximum discharging power; and the determining the power limit coefficient according to the cell voltage extreme value, and the voltage limited power interval corresponding to the temperature data comprises:

determining the first power limit coefficient by comparing the minimum cell voltage with the discharging power limit starting voltage, the discharging power limit cut-off voltage and the discharging power limit recovery voltage respectively, comprising:

acquiring an initial discharging power limit coefficient;

in response to the minimum cell voltage being not less than the discharging power limit starting voltage, determining the first power limit coefficient to be the initial discharging power limit coefficient;

in response to the minimum cell voltage being not greater than the discharging power limit cut-off voltage, determining the first power limit coefficient to be zero;

in response to the minimum cell voltage being between the discharging power limit starting voltage and the discharging power limit cut-off voltage, dynamically calculating and obtaining the first power limit coefficient based on the acquired minimum cell voltage according to a first voltage power limit coefficient formula, such that the first voltage power limit coefficient linearly changes in the discharging power limit, the first voltage power limit coefficient formula is as follows:

$$Limit_{Rate1} = \frac{Vltg_{Min} - V_2}{V_1 - V_2} \times Limit_{Rate3},$$

wherein $Limit_{Rate1}$ denotes the first power limit coefficient, $Vltg_{Min}$ denotes the minimum cell voltage, $V_1$ denotes the discharging power limit starting voltage, $V_2$ denotes the discharging power limit cut-off voltage, and $Limit_{Rate3}$ denotes the initial discharging power limit coefficient; and in response to the minimum cell voltage being greater than the discharging power limit recovery voltage, determining the first power limit coefficient to be the initial discharging power limit coefficient.

2. A method for protecting a battery power limit, applied to a vehicle, the vehicle being provided with a battery management system, wherein the battery power limit comprises a discharging power limit and a charging power limit, and the battery is provided with voltage limited power intervals corresponding to the temperature conditions under different temperature conditions, the method is performed by the battery management system and comprises:

acquiring temperature data, a state of charge, and a cell voltage extreme value of a battery, periodically;

calculating a current maximum available power according to the temperature data and the state of charge, wherein the maximum available power comprises a maximum discharging power and a maximum charging power;

determining a power limit coefficient according to the cell voltage extreme value, and a voltage limited power interval corresponding to the temperature data; and obtaining an actual available power of the battery that the battery management system allows the vehicle to use according to the maximum available power and the power limit coefficient, wherein a calculation formula for obtaining the actual available power that the battery management system allows the vehicle to use according to the maximum available power and the power limit coefficient is as follows:

$$P = Power_{Max} \times Limit_{Rate},$$

wherein P denotes the actual available power, $Power_{Max}$ denotes the maximum available power, and $Limit_{Rate}$ denotes the power limit coefficient; and in the discharging power limit, the power limit coefficient is a first power limit coefficient, and in the charging power limit, the power limit coefficient is a second power limit coefficient, the cell voltage extreme value is a maximum cell voltage, the voltage limited power interval comprises a charging power limit starting voltage, a charging power limit cut-off voltage and a charging power limit recovery voltage, the maximum available power is the maximum charging power; and the determining a power limit coefficient according to the cell voltage extreme value, and a voltage limited power interval corresponding to the temperature data comprises:

determining the second power limit coefficient by comparing the maximum cell voltage with the charging power limit starting voltage, the charging power limit cut-off voltage and the charging power limit recovery voltage, respectively, comprising:

acquiring an initial charging power limit coefficient;

in response to the maximum cell voltage being not greater than the charging power limit starting voltage, determining the second power limit coefficient to be the initial charging power limit coefficient;

in response to the maximum cell voltage being not less than the charging power limit cut-off voltage, determining the second power limit coefficient to be zero;

in response to the maximum cell voltage being between the charging power limit starting voltage and the charging power limit cut-off voltage, dynamically calculating and obtaining the second power limit coefficient based on the acquired maximum cell voltage according to a second voltage power limit coefficient formula, such that the second voltage power limit coefficient linearly changes in the charging power limit, the second voltage power limit coefficient formula is as follows:

$$Limit_{Rate2} = Limit_{Rate4} - \frac{V_5 - Vltg_{Max}}{V_5 - V_4} \times Limit_{Rate4},$$

wherein $Limit_{Rate2}$ denotes the second power limit coefficient, $Vltg_{Max}$ denotes the maximum cell voltage, $V_4$ denotes the charging power limit starting voltage, $V_5$ denotes the charging power limit cut-off voltage, and $Limit_{Rate4}$ denotes the initial charging power limit coefficient; and in response to the maximum cell voltage being less than the charging power limit recovery voltage, determining the second power limit coefficient to be the initial charging power limit coefficient.

3. A system for protecting a battery power limit, comprising a memory, a processor and a computer program stored on the memory and executed on the processor, wherein the computer program, when executed by the processor, causes the processor to implement the method for protecting a battery power limit according to claim 1.

4. A non-transitory computer-readable storage medium, wherein the computer-readable storage medium stores computer executable instructions for causing the computer to implement the method for protecting a battery power limit according to claim 1.

5. A system for protecting a battery power limit, comprising a memory, a processor and a computer program stored on the memory and executed on the processor, wherein the computer program, when executed by the processor, causes the processor to implement the method for protecting a battery power limit according to claim 2.

6. A non-transitory computer-readable storage medium, wherein the computer-readable storage medium stores computer executable instructions for causing the computer to implement the method for protecting a battery power limit according to claim 2.

* * * * *